United States Patent
Puri et al.

(10) Patent No.: US 7,836,328 B1
(45) Date of Patent: Nov. 16, 2010

(54) METHOD AND APPARATUS FOR RECOVERING FROM SYSTEM BUS TRANSACTION ERRORS

(75) Inventors: Rahoul Puri, Los Altos, CA (US); John E. Watkins, Sunnyvale, CA (US); Arvind Srinivsan, San Jose, CA (US); Babu R. Kandimalla, San Jose, CA (US); Nimita Taneja, Castro Valley, CA (US)

(73) Assignee: Oracle America, Inc., Redwood Shores, CA (US)

( * ) Notice: Subject to any disclaimer, the term of this patent is extended or adjusted under 35 U.S.C. 154(b) by 795 days.

(21) Appl. No.: 11/418,900

(22) Filed: May 4, 2006

(51) Int. Cl.
*G06F 11/00* (2006.01)
(52) U.S. Cl. ........................................................ 714/2
(58) Field of Classification Search ................... 714/2
See application file for complete search history.

(56) References Cited

U.S. PATENT DOCUMENTS

| | | | | |
|---|---|---|---|---|
| 5,758,065 | A * | 5/1998 | Reams et al. ................. | 714/48 |
| 6,523,140 | B1 * | 2/2003 | Arndt et al. .................... | 714/44 |
| 6,810,452 | B1 * | 10/2004 | James et al. ................. | 710/104 |
| 6,886,058 | B2 * | 4/2005 | Haren ......................... | 710/65 |
| 2003/0033374 | A1 * | 2/2003 | Horn et al. .................. | 709/217 |
| 2005/0246568 | A1 * | 11/2005 | Davies ......................... | 714/2 |
| 2005/0268027 | A1 * | 12/2005 | Katsuki et al. .............. | 711/105 |

OTHER PUBLICATIONS

Split Transaction Feature for the Intel® PXA27x Processor Family, Intel Corporation, (Oct. 2004).

* cited by examiner

*Primary Examiner*—Scott T Baderman
*Assistant Examiner*—Jigar Patel
(74) *Attorney, Agent, or Firm*—Park, Vaughan, Fleming & Dowler LLP

(57) ABSTRACT

A method and apparatus for recovering from errors occurring during system bus transactions. An input/output device such as a network interface unit (NIU) issues read and write operations across a meta interface coupling the device to host bus (glue) logic. The host bus logic translates the operations into system bus transactions. The device maintains a set of reusable identifiers for identifying the operations, and a table maintained by the device or the host bus logic maps the operation identifiers to transaction identifiers identifying the system bus transactions spawned to perform the operations. If a bus transaction encounters an unrecoverable error, the host bus logic reports the error to the device and drops any further data received from other bus transactions performed for the same operation. The device marks the operation's identifier as dirty, to prevent its reuse. The operation identifier may be reused after software clears the error condition.

19 Claims, 4 Drawing Sheets

METHOD AND APPARATUS FOR RECOVERING FROM SYSTEM BUS TRANSACTION ERRORS

RELATED APPLICATION

This application is related to U.S. patent application Ser. No. 11/418,901, entitled "Abstracted Host Bus Interface for Complex High Performance ASICs", which was filed on May 4, 2006 and is hereby incorporated by reference.

BACKGROUND

This invention relates to the field of computer systems. More particularly, an apparatus and methods are provided for recovering from errors occurring during input/output operations within a computer system.

Many computer system devices or components, such as network interface units or adapters, storage devices, peripheral devices, and so on, initiate input/output operations using DMA (Direct Memory Access) over a host computer's system bus. Split transactions are often enabled to allow improved access to the bus by bus clients.

When split transactions are enabled for read operations, a single read transaction from the device generates two separate system bus transactions: one to issue the read request, and one to return the requested data. In between the two transactions, the system bus is released for use by other devices. When split transactions are disabled, the system bus would be not be relinquished by a component that issued a read request until the requested data were returned.

When split transactions are enabled for write operations, the device that issues a non-posted write operation releases the system bus once the operation has been transferred to the DMA bridge. If split transactions are disabled, the system bus would not be released until acknowledgement of completion of the non-posted write.

The characteristics of read and non-posted write transactions differ, depending on the architecture of the computer system. For example, different types of system buses, such as PCIe (Peripheral Component Interconnect Express) and HT (HyperTransport), allow data transfers of different maximum sizes, may involve different expected or allowable latencies, etc. Some systems do not even allow or support non-posted writes.

Traditionally, a device configured to generate read or write transactions over a system bus contained built-in logic for detecting and possibly handling errors that occur during the transactions. The device would have to include logic capable of tracking transactions for every type of system bus to which it may be attached. Alternatively, different versions of the device would be designed and produced for each type of system bus.

Because each system bus transaction is relatively low-level, usually involving the transfer of a small amount of data, one read operation (e.g., to retrieve data to be transmitted in one packet over a network) or one write operation (e.g., to write the contents of a packet received from a network) may require a number of system bus transactions. If the device is only capable of tracking the statuses of a limited number of system bus transactions, the device may stall whenever the total number of transactions in-flight reaches that number.

SUMMARY

In one embodiment of the invention, a method and apparatus are provided for recovering from errors occurring during system bus transactions. An input/output device such as a network interface unit (NIU) issues read and write operations across a meta interface (or other interface) coupling the device to host bus (glue) logic. The same device is operable with multiple different system host buses, without modification, because the host bus logic contains logic for translating between device semantics (and operations) and system bus semantics (and transactions), thereby alleviating the device from having to understand system bus semantics.

In this embodiment, the meta interface may have a larger maximum transfer unit (MTU) size than the system bus, therefore requiring multiple system bus transactions for each read or write operation. The device maintains a set of reusable identifiers for identifying the operations, and a table maintained by the device or the host bus logic maps the operation identifiers to transaction identifiers identifying the system bus transactions spawned to perform the operations.

If a bus transaction encounters an error, the host bus logic reports the error to the device and may drop any further data received from other bus transactions issued for the same operation and/or data received for any other operations having the same operation identifier. The device marks the operation's identifier as dirty, to prevent its reuse. The operation identifier may be reused after software clears the error condition.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, an apparatus and methods are provided for facilitating recovery from host computer system bus transactions that time out or encounter an error from which the hardware cannot recover. Embodiments of the invention described herein may be implemented to function with various computer system components that perform input/output, such as a network interface unit (NIU), storage device, sound card, graphics device, or any other device that communicates across a host bus. In another embodiment of the invention described below, one host bus is coupled to another host bus, with the ability to recover from an error on either bus.

Figure 1:
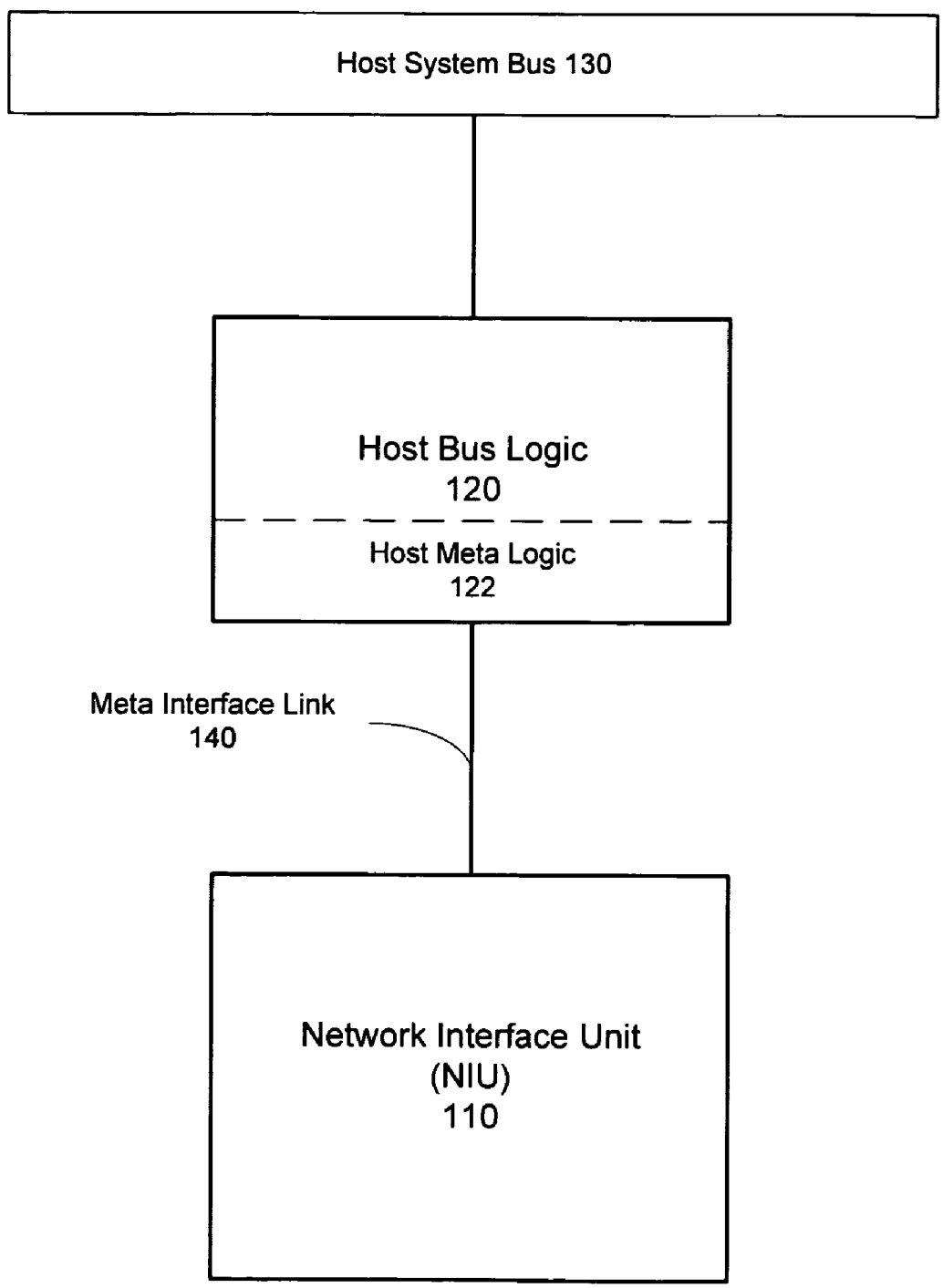
FIG. 1 is a block diagram depicting an apparatus capable of facilitating recovery from system bus transaction timeouts, in accordance with an embodiment of the present invention.

FIG. 1 is a block diagram depicting the implementation of an embodiment of the invention in conjunction with a network interface unit. NIU 110 is coupled to host bus logic 120 via meta interface 140. Host bus logic 120 is coupled to host system bus 130. In other embodiments of the invention, another type of input/output device may be substituted for NIU 110 (e.g., a disk controller).

The host system bus may conform to any of a variety of bus architectures, such as PCIe (Peripheral Component Interconnect Express), SIU (System Interface Unit) or HT (Hyper Transport). Host bus logic 120 may thus comprise PEU (PCIe Unit), SMX (SIU Meta Interface), HT glue logic or other glue logic designed to translate between input/output operations initiated by a input/output device (e.g., NIU 110) and transactions performed on a system bus as part of an input/output operation.

In this embodiment of the invention, NIU 110 may be implemented with different host bus logic modules and corresponding system buses, without modification. More specifically, NIU 110 is not limited to operation with any particular host system bus because host bus logic 120 translates between host bus semantics and NIU semantics, thereby relieving the NIU from having to monitor system bus transactions.

Because the input/output device (NIU 110) is operable with different system bus architectures, only one verification scheme need be implemented, regardless of the system bus. And, because the device operates the same in each case, its integrity is more certain.

In one implementation, meta interface 140 provides a point-to-point link comprising three functional groups, REQUEST, RESPONSE and ACKNOWLEDGEMENT, each having a separate queue. The REQUEST queue handles COMMAND requests and transmits payloads (e.g., payloads of packets received by NIU 110 from a communication link) from the NIU to host bus logic 120. The host bus logic translates REQUEST queue commands into appropriate system bus transactions.

The RESPONSE queue receives COMMAND responses and data (e.g., for packets to be transmitted by NIU 110) from the host bus logic for the NIU. The COMMAND responses may comprise translations of host bus transactions received by the host bus logic.

The ACKNOWLEDGEMENT queue indicates when non-posted writes have been completely serviced. Thus, if a non-posted write of 1 KB is segmented into four 256 byte write transactions over host system bus 130, an ACKNOWLEDGEMENT is generated only when all of the write transactions have completed.

Each input/output operation issued by NIU 110 (e.g., to read from or write to memory via DMA) is assigned an operation identifier from a pool of reusable identifiers. Each such operation is a complete operation from the point of view of the NIU. Thus, a write operation to write the contents of a packet received from a network may involve the writing of a relatively large block of data (e.g., 4 KB). A read operation associated with the transmission of a packet similarly may involve the retrieval of the entire payload of the packet.

As one skilled in the art will appreciate, the scope or size of an input/output operation issued by the NIU may be larger than the scope or size of transactions issued over host system bus 130. Therefore, one operation issued by NIU 110 may cause host bus logic 120 to spawn multiple system bus transactions if the host bus MTU (Maximum Transfer Unit) is smaller than the MTU of meta interface 140 (e.g., 4 KB). In one embodiment of the invention, the host bus logic primarily uses split transactions to conduct input/output operations requested by the NIU, particular read operations.

The NIU maintains a limited number of operation identifiers (e.g., 32 for PCIe) to assign to the input/output operations it issues. In one implementation, the limited pool of operation identifiers may be used only for split read operations and split non-posted write operations (i.e., read operations that will spawn split read transactions, and non-posted write operations that will spawn split non-posted write transactions). After an operation to which a particular identifier is assigned completes successfully, the identifier can be reused for another operation.

However, in one embodiment of the invention, when the NIU is informed by the host bus logic that a system bus transaction issued in conjunction with an input/output operation fails, the NIU treats the entire operation as having failed. The corresponding operation identifier is then marked (e.g., placed in a "dirty" bin) to prevent its reuse. In this embodiment, only after the error condition is cleared by software will the "dirty" operation identifier be allowed to be reused. By marking the operation identifier as dirty, the problem of ghost data is eliminated.

In particular, two types of ghost data are suppressed. One type of ghost data (which may be termed "transaction-level" ghost data) results from a system bus transaction spawned by an input/output operation after the failure of a previous transaction spawned by the same operation. Another type of ghost data (which may be termed "operation-level" ghost data) includes data that are received in response to a particular input/output operation, but only after a later operation having the same operation identifier is issued.

In the illustrated embodiment of the invention, to facilitate the separation of NIU 110 from the host computer system bus, host bus logic 120 includes host meta logic 122. Host meta logic 122 is specific to the type of host bus; thus different host meta logic is included in different types of host bus logic used with different host bus types (e.g., PCIe, SIU, HT).

Host meta logic 122 receives read and write requests from NIU 110, via meta interface 140, and initiates corresponding transactions on system bus 130. Each such system transaction may be handled in a normal manner by host bus logic 120 and system bus 130.

A table or other structure may be maintained by the host bus logic or, alternatively, NIU 110, to map an operation's operation identifier to the transaction identifiers of the corresponding system bus transactions. Each entry in the table corresponds to a read or write operation, using the corresponding operation identifier as the entry's address, and includes fields for each system bus transaction issued on behalf of the operation. Maintaining the table in the host bus logic may promote abstraction of host buses.

Different arbiters may be employed in NIU 110 for issuing split read operations and split non-posted write operations. The host bus logic (meta logic 122) may therefore include a (programmable) threshold indicating a maximum number of either type of operation that may be in flight at one time.

Host meta logic 122 tracks completion of system bus transactions by receiving a response (e.g., to a split read transaction), identifying the response by its transaction identifier, mapping the transaction identifier to the corresponding operation identifier, and updating its status. Each successful split read transaction may be reported or forwarded back to the NIU as it is completed, in which case the NIU may reorder the read data as needed. Each successful non-posted write is reported to the NIU only when the final corresponding system bus transaction is dispatched and/or completed.

Thus, errors on system bus 130 need not be directly reported to NIU 110. Instead, any recoverable errors are recovered, and any time-outs or other non-recoverable errors cause host bus logic 120 (e.g., host meta logic 122) to signal a failure to the NIU. Illustratively, the failure is reported with the corresponding operation identifier, thereby allowing the NIU to remain isolated from operation of the system bus. The host bus logic may then drop any further data it receives from the system bus that corresponds to the same operation.

Figure 2:
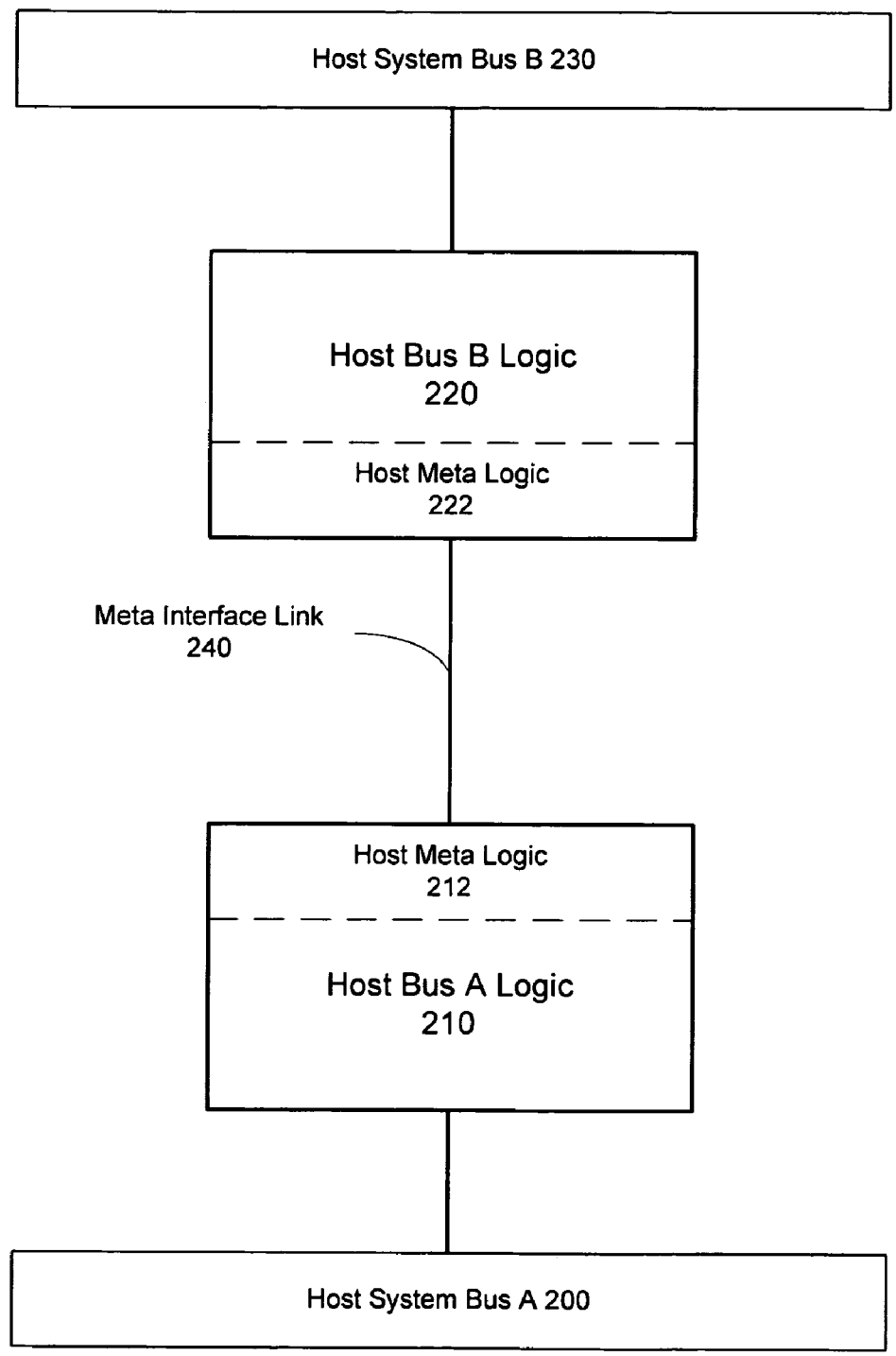
FIG. 2 is a block diagram depicting another apparatus capable of facilitating recovery from system bus transaction timeouts, in accordance with another embodiment of the present invention.

FIG. 2 illustrates the configuration of an apparatus for bridging host buses and recovering from a host system bus error, according to an alternative embodiment of the invention. In FIG. 2, system buses A 200 and B 230 are coupled via corresponding bus logic 210, 220 and meta interface link 240. Any types of input/output devices may be coupled to the host buses, including storage devices, communication devices and so on.

In this embodiment of the invention, host bus A logic 210 includes host meta logic 212, and host bus B logic 220 includes host meta logic 222. Meta logic 212, 222 operate in similar fashion to meta logic 122 of FIG. 1.

In particular, because either host bus may operate with an MTU larger than the other, an input/output operation initiated on a host bus having a larger MTU may spawn multiple transactions on the other host bus. Therefore, a method of recovering from a system bus transaction error described herein may be implemented in host meta logic 212, 222, to prevent reuse of an operation identifier that was assigned to the operation that incurred the error.

Figure 3:
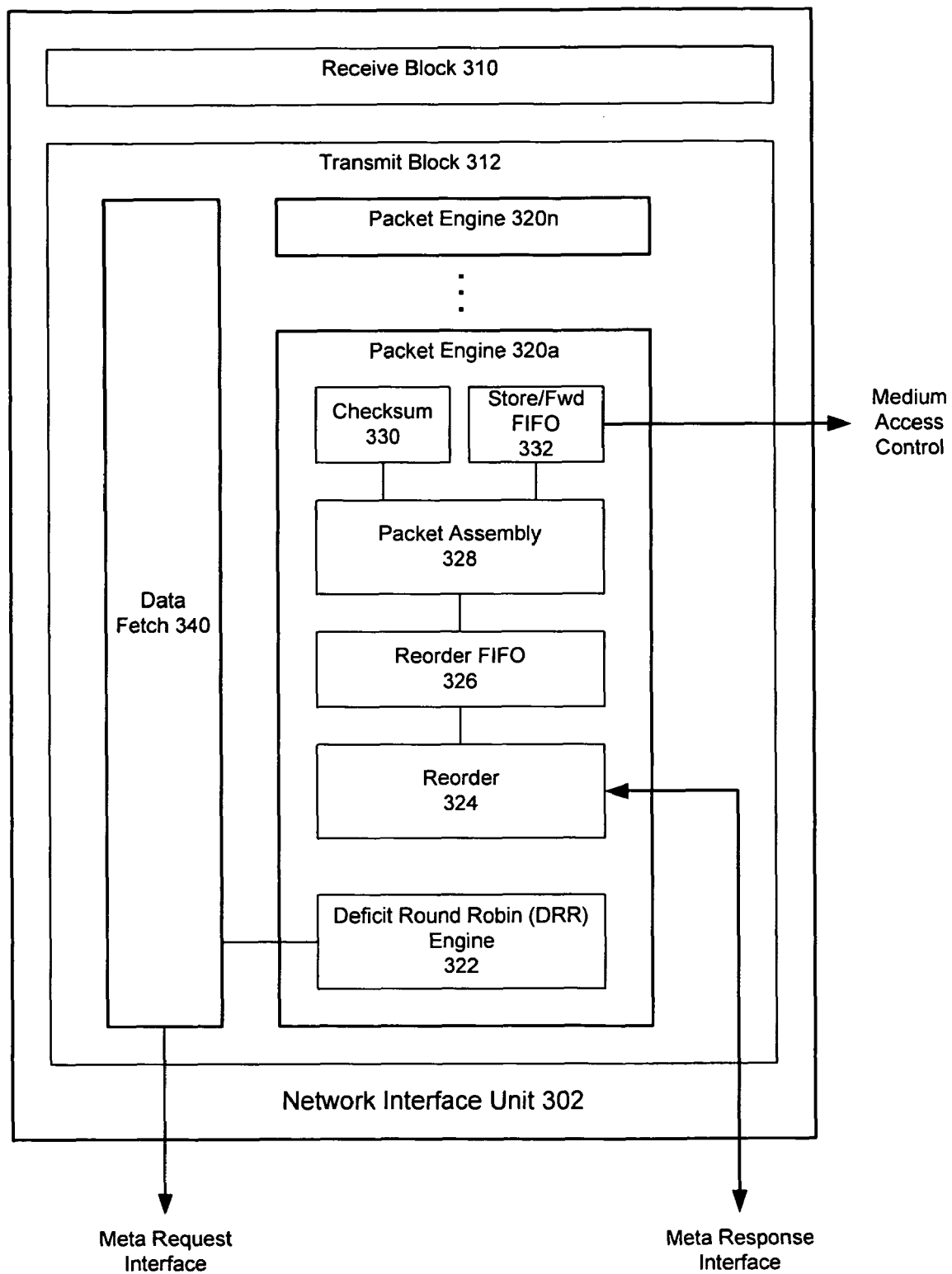
FIG. 3 is a block diagram depicting a network interface unit with which an embodiment of the present invention may be implemented.

FIG. 3 is a block diagram of a network interface unit (NIU) with which an embodiment of the invention may be implemented. In this embodiment, NIU 302 includes two blocks: receive (Rx) block 310 and transmit (Tx) block 312.

The Rx block receives data (e.g., packets, frames, cells) over a communication link (e.g., a network connection) and forwards the data to memory or other storage. The Tx block retrieves data from memory or some other system component, and sends it over the communication link in the form of packets or other constructs. The structure and operation of Rx block 310 may be discerned from the following description of Tx block 312.

Transmit block 312 includes a transmit controller (TXC) comprising any number of DMA packet engines 320 (i.e., engines 320a-320n), and data fetch module 340. In one implementation, four packet engines are employed: two for use with 10 G MAC modules and two for use with 1 G MAC modules. Tx block 312 and/or other components of NIU 302 may also include DMA engines.

Data fetch module 340 issues read operations to the host bus logic via the REQUEST queue of the meta interface. Packet engine 320a includes DRR (Deficit Round Robin) engine 322, which is configured to generate read operations for the data fetch module to issue to the host bus logic.

Packet engine 320a also includes several modules for handling data received in response to a read operation and preparing the data for transmission. Illustratively, reorder engine 324 receives the data from the host bus logic via the RESPONSE queue of the meta interface and reorders it with the assistance of reorder FIFO queue 326. After the data for a packet (or other transmission construct) is reordered, it is fed to packet assembly module 328, which adds headers and formats the data as necessary. Checksum 330 calculates a checksum on the packet, if enabled, and store/forward FIFO queue 332 feeds the packet to a MAC (Medium Access Control) module for transmit or dispatch.

The diagram of FIG. 3 omits some components involved in the processing of incoming and outgoing communications.

Figure 4:
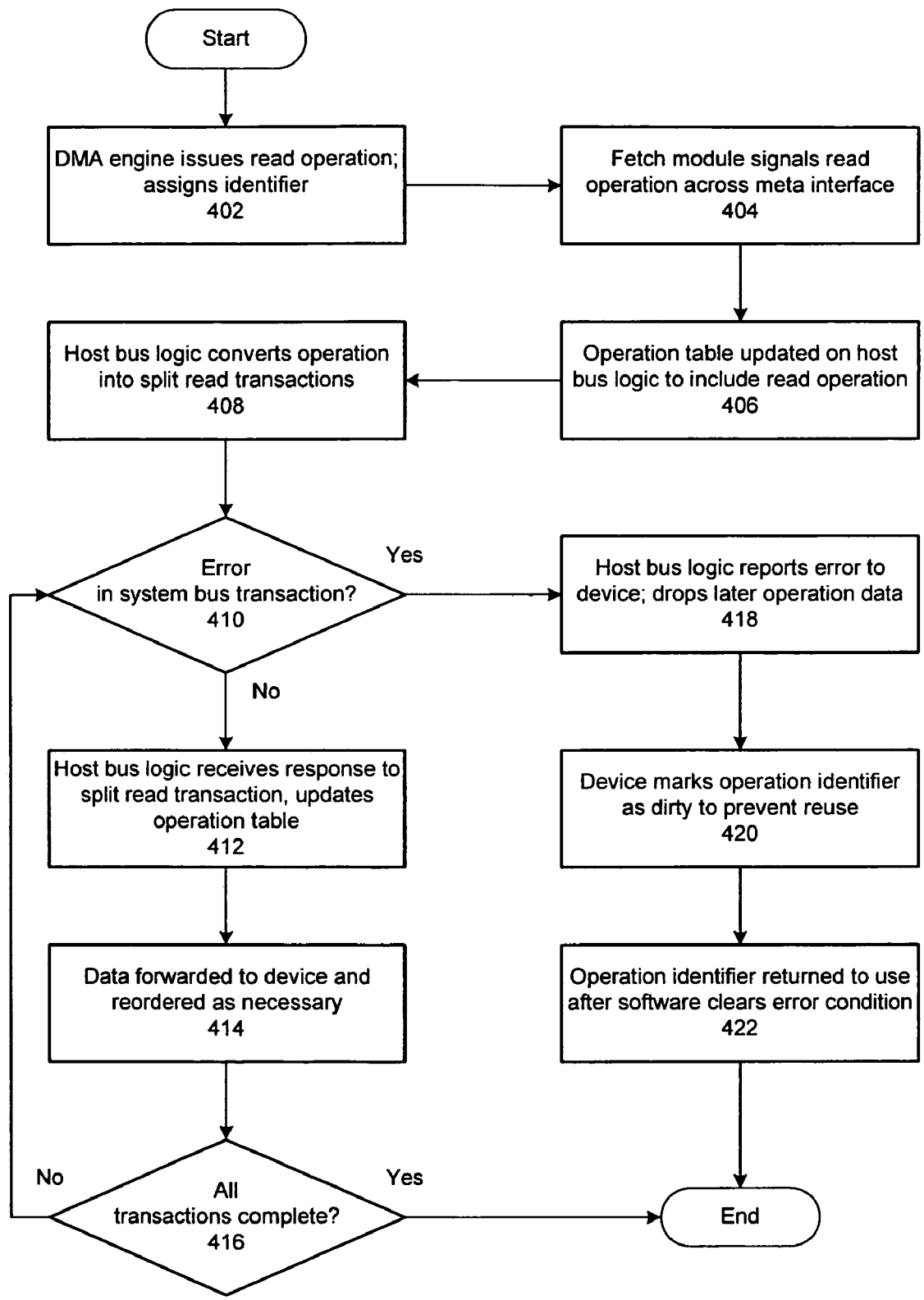
FIG. 4 is a flowchart illustrating one method of handling the failure of a system bus transaction, in accordance with an embodiment of the invention.

FIG. 4 demonstrates a method of handling a system bus transaction error encountered during an input/output operation, according to one embodiment of the invention.

In operation 402, a DMA engine of an input/output device (or other client that performs DMA operations) issues a read operation across a meta interface, an interface coupling the device to host bus logic. The DMA engine assigns an operation identifier to the operation.

In operation 404, a fetch module (or similar component) of the device signals the read operation across the meta interface to the host bus logic.

In operation 406, an operation table maintained within the host bus logic is updated to include the new read operation. The new table entry is populated with the operation identifier and any other pertinent information, such as an identifier of the device client that issued the operation, address of request, length of request, DMA number, port number, etc.

In operation 408, the host bus logic spawns one or more split read transactions, on a host system bus, to carry out the DMA engine's read operation. The operation table is updated to associate the transactions, including transaction identifiers, with the operation.

In operation 410, the host bus logic determines whether a system bus transaction encountered an error that the logic cannot recover from, or that it has been programmed to take particular action in response to. In particular, the host bus logic may be configured to cancel or abort an operation in the event one (or more) of the spawned system bus transactions times out or results in a predetermined error. For example, if a read request is segmented (e.g., because the host bus MTU is much smaller than the length of the read request) and an error or timeout occurs midway through the read segmentation, the request may be aborted or segmentation may continue (with all the segmented reads being marked as bad).

If an error severe enough to cause the operation to be aborted is detected, the illustrated method advances to operation 418. Otherwise, the method continues at operation 412.

In operation 412, the host bus logic receives a response to one of the system bus transactions, including some of the requested data. The operation table is updated to reflect the transaction's successful completion.

In operation 414, the host bus logic passes the data to the input/output device, which may reorder the data as necessary.

In operation 416, it is determined whether all system bus transactions spawned from the read operation have completed. If so, the method ends; otherwise, the method returns to operation 410 to await the next response or an error.

In operation 418, the host bus logic reports an error to the input/output device, and may drop any data later received in response to one of the operation's system bus transactions. The operation table may be updated to reflect the error.

In operation 420, the device marks the operation identifier as dirty, to prevent its reuse. One or more transaction identifiers, corresponding to system bus transactions associated with the operation, may also be marked as dirty.

In operation 422, after software or the system clears the error that caused the operation to be aborted, the dirty operation identifier and/or transactions identifiers are returned for reuse. The method then ends.

In one alternative embodiment of the invention, if a non-recoverable error is encountered but no ghost data or ghost transactions exist, operation identifiers and transaction identifiers associated with the error need not be removed from use. If the error does leave ghost data or transactions, corresponding identifiers may be removed from use as reflected in the method of FIG. 4.

When an operation identifier and/or transaction identifier is removed from use, they may be cleared for return to use in a selective manner (e.g., based on the type of error)

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A method of handling an error in a split transaction issued over a host bus of a computer system, the method comprising:
   at an input/output device of a computer system:
      assigning a first operation identifier to a first input/output operation, wherein the first operation identifier is one of a limited number of multiple reusable operation identifiers used to identify input/output operations; and
      issuing the first input/output operation across an interface link coupling the input/output device to host bus logic coupled to the host bus;
   at the host bus logic:
      issuing a plurality of split transactions over the host bus to accomplish the input/output operation;
      detecting an error occurring during one of the split transactions; and
      notifying the input/output device of the error; and
   at the input/output device, preventing reuse of the first operation identifier;
   wherein said reusable operation identifiers are used only to identify:
      (i) read operations for which the host bus logic is configured to issue split read transactions; and
      (ii) write operations for which the host bus logic is configured to issue split non-posted write transactions.

2. The method of claim 1, wherein the error is one of a set of errors from which the host bus logic cannot recover.

3. The method of claim 2, wherein statuses of the split transactions, other than the set of errors, are not conveyed to the input/output device.

4. The method of claim 1, further comprising, at the host bus logic:
   maintaining a table configured to map between the first operation identifier and transaction identifiers identifying the split transactions.

5. The method of claim 1, further comprising, at the input/output device:
   reordering contents of responses to the split transactions.

6. The method of claim 1, further comprising, at the input/output device:
   after said preventing reuse of the first operation identifier, allowing reuse of the first operation identifier after failure of the split transaction is cleared by software.

7. The method of claim 1, further comprising, at the input/output device:
   maintaining a table configured to map between the first operation identifier and transaction identifiers identifying the split transactions.

8. A computer readable medium storing instructions that, when executed by a computer, cause the computer to perform a method of handling an error in a split transaction issued over a host bus of a computer system, the method comprising:
   at an input/output device of a computer system:
      assigning a first operation identifier to a first input/output operation, wherein the first operation identifier is one of a limited number of multiple reusable operation identifiers used to identify input/output operations; and
      issuing the first input/output operation across an interface link coupling the input/output device to host bus logic coupled to the host bus;
   at the host bus logic:
      issuing a plurality of split transactions over the host bus to accomplish the input/output operation;
      detecting an error occurring during one of the split transactions; and
      notifying the input/output device of the error; and
   at the input/output device, preventing reuse of the first operation identifier;
   wherein said reusable operation identifiers are used only to identify:
      (i) read operations for which the host bus logic is configured to issue split read transactions; and
      (ii) write operations for which the host bus logic is configured to issue split non-posted write transactions.

9. An apparatus for managing errors detected in split transactions issued to perform an input/output operation, the apparatus comprising:
   a device for performing input/output operations for a host computer, wherein each input/output operation is assigned one of a limited number of reusable operation identifiers by said device;
   host bus logic coupled to a host bus of the host computer and configured to:
      transform a single input/output operation received from said device into a plurality of split host bus transactions;
      issue the split transactions over the host bus; and
      detect a failure of one of the split transactions; and
   a meta interface link coupling said device to the host bus logic;
   wherein said reusable operation identifiers are used only to identify:
      (i) read operations for which the host bus logic is configured to issue split read transactions; and (ii) write operations for which the host bus logic is configured to issue split non-posted write transactions; and wherein said device is configured to prevent a first operation identifier assigned to a first input/output operation from being reused if one of the split transactions of the first input/output operation fails.

10. The apparatus of claim 9, wherein a maximum transfer unit of said meta interface link is larger than a maximum transfer unit of the host bus.

11. The apparatus of claim 9, further comprising:
additional host bus logic coupled to a second host bus of the host computer and configured to:
transform a single input/output operation received from said device into a plurality of split transactions;
issue the split transactions over the second host bus; and
detect a failure of one of the split transactions;
wherein said meta interface link simultaneously couples said device to said host bus logic and said additional host bus logic.

12. The apparatus of claim 11, wherein only one of said host bus logic and said additional host bus logic is active.

13. The apparatus of claim 9, wherein said device is a network interface unit.

14. The apparatus of claim 9, wherein the host bus is distinct from the meta interface and couples the host bus logic to a system interface unit.

15. The apparatus of claim 9, wherein said host bus logic comprises glue logic for a system interface unit bus.

16. The apparatus of claim 9, wherein the host bus is distinct from the meta interface and couples the host bus logic to a PCIe (Peripheral Component Interconnect Express) bridge.

17. The apparatus of claim 9, wherein said host bus logic comprises glue logic for a PCIe (Peripheral Component Interconnect Express) bus.

18. The apparatus of claim 9, wherein the host bus is distinct from the meta interface and couples the host bus logic to a DMA (Direct Memory Access) controller.

19. The apparatus of claim 9, wherein said host bus logic comprises glue logic for a HyperTransport bus.

* * * * *